Patented Apr. 29, 1941

2,240,344

UNITED STATES PATENT OFFICE 2,240,344

PREPARATION OF HYPOCHLOROUS ACID

Irving E. Muskat, Akron, and George H. Cady, Wadsworth, Ohio, assignors to Pittsburgh Plate Glass Company, Allegheny County, Pa., a corporation of Pennsylvania No Drawing. Application July 23, 1938, Serial No. 221,018

16 Claims. (Cl. 23—152)

This invention relates to the manufacture of hypochlorous acid and is particularly directed to the manufacture of a highly concentrated product which is substantially free from chlorides, chlorates and other impurities. Prior to this invention, it has been considered that hypochlorous acid, particularly in high concentrations, could not be commercially produced. While it has long been recognized that chlorine monoxide produced hypochlorous acid when dissolved in water, the preparation of this material has been considered to be too expensive for a commercial process. In addition, chlorine monoxide in its pure state not only has been somewhat difficult to produce economically but also is extremely unstable, often decomposing with explosive violence. For these and other reasons, the production of hypochlorous acid has not been considered commercially feasible prior to this invention.

In accordance with our invention, we have found that these objections may be avoided and hypochlorous acid produced in a simple and economical manner. We have found that, in the production of hypochlorous acid in large quantities, it is desirable to convert only a portion of a body of chlorine, preferably a minor portion thereof, into chlorine monoxide whereby a mixture of these gases in which the chlorine monoxide concentration is not excessive, is obtained. The chlorine monoxide in this mixture may be separated therefrom by passage of the gas through a controlled quantity of water in which this compound dissolves without substantial solution of chlorine. The chlorine may then be recycled to produce further amounts of chlorine monoxide. In order to avoid formation of chlorates in accordance with our invention, it has been found desirable to remove salts or alkaline materials which may be suspended or otherwise present in the chlorine-chlorine monoxide mixtures and to use water which is substantially free from these materials.

This process is particularly adapted to the preparation of hypochlorous acid using processes wherein the percent of conversion of chlorine into chlorine monoxide and the chlorine monoxide concentration in the mixture to be treated with water are relatively low. For example, it has been found that chlorine monoxide in concentrations up to 5 percent by volume may be produced in gaseous form by contacting chlorine gas and a suitable diluent, such as air, carbon dioxide with sodium or potassium carbonate, sodium bicarbonate, hydroxide, silicate, etc., in the presence of a small amount of water. These processes have been more fully described in copending applications of George H. Cady, Serial No. 190,618, filed February 15, 1938, and Serial No. 216,475, filed June 29, 1938. While these processes produce chlorine monoxide in good yield, the percentage conversion may be relatively low and in consequence, it is generally found that the amount of chlorine monoxide does not exceed 5 percent by volume and in many cases is less than 2–3 percent by volume. Similarly, chlorine monoxide in low concentrations may be secured by contact of chlorine with barium hydroxide or strontium hydroxide.

Such low concentrations are found to be particularly desirable in the present process. While the process is particularly adapted for use with those methods of preparation in which a major portion of the chlorine remains unconverted, it may also be applied to those methods wherein conversion is ordinarily high. Thus, chlorine monoxide may be produced by contact with oxygen carriers such as mercuric oxide or silver oxide. In such cases, however, it is found preferable to avoid a possible complete conversion of the chlorine in order to carry out the process efficiently and economically.

Other methods of converting chlorine into chlorine monoxide may also be used. However, it is generally considered essential that the chlorine-chlorine monoxide mixture be free from gases which would tend to decompose hypochlorous acid or to form undesirable compounds in the solution. Thus, it is found desirable to avoid the presence of other oxides of chlorine, such as chlorine dioxide or of acidic gases such as HCl and methods which tend to produce such materials in objectionable amounts are preferably avoided.

The treatment is preferably carried out in the presence of a diluent in order to insure maximum yield and efficiency in the production of chlorine monoxide and to prevent substantial consumption of chlorine by formation of chlorates or other compounds during the treatment. Gaseous diluents, such as carbon dioxide, air or nitrogen, have been found suitable in many cases. In addition, liquid diluents, such as carbon tetrachloride may also be used. When gaseous diluents are used, it is found desirable to use a chlorine-diluent mixture wherein the diluent concentration is 40–95 percent by volume of the total gas in the conversion chamber. Gaseous diluents appear to have the property of decreasing the amount of chlorine which is absorbed by the water without exerting any substantial influence upon the amount of chlorine monoxide absorbed. At all events, it is found that when gaseous diluents are used substantially less chlorine is absorbed in the HOCl solution than when they are not present.

Thus, when the diluent concentration is 40-95 percent by volume of the total amount of gas being treated, it is found that the chlorine content in the hypochlorous acid is only about one-tenth to one-half of the chlorine concentration in hypochlorous acid of the same concentration which is produced without use of these diluents. In cases where carbon tetrachloride is used as the diluent, the chlorine concentration may be of any convenient value up to saturation. The chlorine monoxide may be extracted from the carbon tetrachloride solution by contact with water, without substantial extraction of chlorine and the remaining solution of chlorine in carbon tetrachloride recycled for further treatment.

In order to secure hypochlorous acid which is substantially free of chlorate, it is found preferable to remove suspended impurities, such as chlorides, chlorites, alkaline materials, or other materials which may be taken up during the conversion step, from the chlorine-chlorine monoxide mixture prior to contacting it with water. When chlorine is contacted with sodium carbonate, bicarbonate, mercuric oxide or other agent for the production of chlorine monoxide, the resulting mixture is often found to contain residual amounts of these materials or their reaction products. If the mixture is directly introduced into the water, undesirable quantities of chlorate and other impurities will be formed in the hypochlorous acid. The suspended impurities may be removed from the gas in suitable manner as by filtration, settling, or other separation processes, such as by contacting the gas with hypochlorous acid.

In order to separate the chlorine and chlorine monoxide, the mixture thus secured is introduced into a body of water. Some control of the ratio of the amount of water to the amount of chlorine-chlorine monoxide mixture to be treated is required since the presence of a substantial excess of water results in the solution of an undesirable amount of chlorine. It has been determined that the presence of chlorine monoxide has a depressing effect upon the solubility of chlorine in aqueous solutions and that minimum amounts of chlorine will be dissolved in a solution containing a substantial concentration of hypochlorous acid. Thus, it is preferred that the amount of water used to treat the gas shall not be in excess of that required to produce a solution of hypochlorous acid having a concentration of approximately 4 percent HOCl by weight or more.

In general, it is considered desirable to prepare solutions of 10-20 percent concentration. However, lower concentrations of hypochlorous acid may be prepared, particularly, when gaseous diluents are used. The amount of water to be used for a given volume of chlorine monoxide-chlorine mixture will depend largely upon the composition of the mixture and the concentration of diluent present. Where the diluent concentration is high, for example, 40 percent and above, the amount of water used may be somewhat larger than where the diluent concentration is low or where no diluent is used. Usually, the preparation of a solution having a concentration substantially below 2 percent HOCl by weight is considered undesirable. In order to obtain efficient absorption, it is preferred to use cool or cold water. In general, the temperature of absorption is maintained below 25° C. Absorption may be carried out with some success at higher temperatures however.

The absorption of the chlorine monoxide may be carried out in any convenient manner but is generally effected in a suitable extraction tower. In such a case, water is introduced in an upper portion of the tower while the gaseous mixture is introduced in a lower portion thereof, the two contacting each other in countercurrent flow. By regulation of the rate of flow of water and/or of the gas, the concentration of the resulting solution may be regulated in a simple manner. Where a solution of chlorine and chlorine monoxide is formed, for example a carbon tetrachloride solution, similar countercurrent extraction methods may be provided or the solution may be agitated with a controlled body of water.

After contact of the chlorine-chlorine monoxide mixture with water in accordance with our invention, the major portion of the chlorine monoxide is removed while substantially all of the chlorine remains. This chlorine may then be recycled for the production of further quantities of chlorine monoxide.

The hypochlorous acid prepared in accordance with the present invention is found to be extremely pure. In general, it contains not in excess of about 0.3-0.4 percent of chlorine or chlorides, generally not more than 0.05 percent of these materials, and up to 10-30 percent of HOCl. Due to its purity, it is exceptionally stable and retains its active chlorine content for a long period of time.

The following examples illustrate the invention:

*Example I*

A mixture of 648 parts by volume of carbon dioxide and 82 parts by volume of chlorine was humidified by bubbling through water at 16° C. This mixture was then countercurrently contacted with powdered, dry sodium carbonate in the proportion of 15 liters of gas per gram of soda ash at a temperature of 30° C. at atmospheric pressure. The gas, after treatment, contained 1.25 percent by volume of chlorine monoxide. The gaseous mixture was passed through a cyclone separator to remove suspended impurities and was bubbled through a body of water until a solution containing 196 grams of HOCl per liter and only 0.1 percent of chlorine was obtained. This solution was also substantially free of chlorides and chlorates.

*Example II*

A gaseous mixture of six parts of carbon dioxide, three parts of air and one part of chlorine, by volume, was saturated with water vapor at 70° F. This mixture was then countercurrently contacted with dry soda ash in the proportion of 230 cubic feet of the gas per minute to 75 pounds of solid per hour at 90° F. and atmospheric pressure. The gaseous mixture was then passed through a cyclone separator and later blown against a small stagnant pool of hypochlorous acid to remove the suspended solids before being forced upward through a packed tower where the dust-free mixture countercurrently contacted cold water fed in the proportion of one gallon of water to 345 cu. ft. of gas. The solution withdrawn from the bottom of the tower contained 1.26 pounds of HOCl and only about 0.0028 pound of $Cl_2$ per gallon. In order to remove the carbon dioxide generated by the reaction of chlorine with soda ash, a small fraction of the gas flowing from the top of the tower was allowed to escape; however, the main bulk of the gas was recirculated through the system. The concentration of chlorine in the mixture was maintained at a constant value by continuously adding the required amount of the halogen to the stream of gas.

This application is a continuation-in-part of application 166,516, filed September 30, 1937.

Although the present invention has been described with reference to the specific details of certain embodiments thereof, it is not intended that such details shall be regarded as limitations upon the scope of the invention except insofar as included in the accompanying claims.

We claim:

1. The process of preparing hypochlorous acid which comprises treating a body of chlorine and a diluent to convert only a minor portion of the chlorine into chlorine monoxide leaving a substantial portion of the chlorine unconverted, contacting the resulting mixture comprising chlorine and chlorine monoxide with a quantity of water sufficient to absorb a substantial amount of the chlorine monoxide but insufficient to dissolve a substantial quantity of chlorine and recycling the unabsorbed chlorine to form more chlorine monoxide.

2. The process of preparing hypochlorous acid which comprises treating a body of chlorine in the presence of an alkali to convert only a portion of the chlorine into chlorine monoxide leaving a substantial portion of the chlorine unconverted, removing at least a portion of the suspended alkaline impurities which have been taken up by the chlorine from the alkali from the resulting mixture comprising chlorine and chlorine monoxide, contacting the mixture with a quantity of water sufficient to absorb a substantial quantity of chlorine monoxide but insufficient to dissolve substantial amount of chlorine and recycling the unabsorbed chlorine to form more chlorine monoxide.

3. The process of preparing hypochlorous acid which comprises contacting a body of chlorine with a material of the group consisting of sodium carbonate, sodium bicarbonate and mixtures thereof to convert only a portion of the chlorine into chlorine monoxide, removing at least a portion of suspended alkaline materials from the resulting mixture comprising chlorine and chlorine monoxide, contacting the mixture with a quantity of water sufficient to absorb a substantial amount of chlorine monoxide but insufficient to dissolve a substantial quantity of chlorine and recycling the unabsorbed chlorine to form more chlorine monoxide.

4. The process of preparing hypochlorous acid which comprises treating a mixture of chlorine and a gaseous diluent to convert only a portion of the chlorine into chlorine monoxide leaving a substantial portion of the chlorine unconverted, contacting the resulting mixture comprising chlorine and chlorine monoxide with a quantity of water sufficient to absorb a substantial quantity of chlorine monoxide and produce a solution of hypochlorous acid containing not substantially less than 4 percent HOCl by weight, but insufficient to dissolve a substantial quantity of chlorine and recycling the unabsorbed chlorine to form more chlorine monoxide.

5. The process of preparing hypochlorous acid which comprises contacting chlorine with a material of the group consisting of sodium carbonate, sodium bicarbonate and mixtures thereof to convert a portion of said chlorine to chlorine monoxide, contacting the mixture of chlorine and chlorine monoxide thereby produced with sufficient water to absorb a substantial amount of chlorine monoxide without substantial absorption of chlorine and recycling at least a portion of the unreacted chlorine to form more chlorine monoxide.

6. A process of preparing hypochlorous acid which comprises contacting chlorine with an alkaline alkali metal compound to convert a portion of said chlorine to chlorine monoxide, contacting the mixture of chlorine and chlorine monoxide thereby produced with sufficient water to absorb a substantial amount of chlorine monoxide without substantial absorption of chlorine and recycling at least a portion of the unreacted chlorine to form chlorine monoxide.

7. A process of preparing hypochlorous acid which comprises contacting chlorine with barium hydroxide to convert a portion of said chlorine to chlorine monoxide, contacting the mixture of chlorine and chlorine monoxide thereby produced with sufficient water to absorb a substantial amount of chlorine monoxide without substantial absorption of chlorine and recycling at least a portion of the unreacted chlorine to form more chlorine monoxide.

8. A process of preparing hypochlorous acid which comprises contacting chlorine with strontium hydroxide to convert a portion of said chlorine to chlorine monoxide, contacting the mixture of chlorine and chlorine monoxide thereby produced with sufficient water to absorb a substantial amount of chlorine monoxide without substantial absorption of chlorine and recycling at least a portion of the unreacted chlorine to form more chlorine monoxide.

9. A process of preparing hypochlorous acid which comprises contacting a humidified mixture of chlorine and a diluent with an alkaline alkali metal compound to convert a portion of said chlorine to chlorine monoxide, contacting the mixture of chlorine and chlorine monoxide thereby produced with sufficient water to absorb a substantial amount of chlorine monoxide without substantial absorption of chlorine and recycling at least a portion of the unreacted chlorine to form more chlorine monoxide.

10. The process of preparing hypochlorous acid which comprises treating a body of chlorine to convert only a portion of the chlorine into chlorine monoxide leaving a substantial portion of the chlorine unconverted removing at least a portion of the suspended impurities from the resulting mixture comprising chlorine and chlorine monoxide by contacting the gaseous mixture with hypochlorous acid, contacting the mixture purified with a quantity of water sufficient to absorb a substantial amount of chlorine monoxide but insufficient to dissolve a substantial quantity of chlorine and recycling the unabsorbed chlorine to form more chlorine monoxide.

11. The process of preparing hypochlorous acid while minimizing the amount of chlorine dissolved therein which comprises treating a mixture containing chlorine and a substantial quantity of a diluent to convert a portion of the chlorine into chlorine monoxide leaving a substantial portion of the chlorine unconverted, and contacting the resulting mixture with a quantity of water sufficient to absorb a substantial amount of chlorine monoxide but insufficient to dissolve a substantial quantity of chlorine, the diluent concentration being of sufficient magnitude that the tendency of chlorine to be absorbed during contact with the water is substantially minimized.

12. A process of preparing hypochlorous acid which comprises contacting chlorine with an alkaline alkali metal compound to convert a portion of said chlorine to chlorine monoxide, removing suspended alkaline impurities, contacting the mixture of chlorine and chlorine monoxide thereby produced with sufficient water to absorb a substantial amount of chlorine monoxide without substantial absorption of chlorine and recycling at least a portion of the unreacted chlorine to form chlorine monoxide.

13. The process of preparing hypochlorous acid which comprises treating a body of chlorine and sufficient diluent to convert only a minor portion of the chlorine into chlorine monoxide leaving a substantial portion of the chlorine unconverted to produce a gaseous mixture containing not substantially in excess of 5 percent by volume of chlorine monoxide and at least about 40 percent by volume of the diluent, contacting the resulting mixture comprising chlorine and chlorine monoxide with a quantity of water sufficient to absorb a substantial amount of the chlorine monoxide but insufficient to dissolve a substantial quantity of chlorine and recycling the unabsorbed chlorine to form more chlorine monoxide.

14. The process of preparing hypochlorous acid which comprises treating a body of chlorine and sufficient gaseous diluent to convert only a portion of the chlorine into chlorine monoxide and thereby to produce a gaseous mixture containing chlorine monoxide, at least about 40 percent by volume of diluent and, a substantial quantity of chlorine, contacting the resulting mixture with a limited quantity of water sufficient to absorb a substantial quantity of the chlorine monoxide, but insufficient to dissolve a substantial quantity of chlorine at a temperature not substantially in excess of 25° C. until a solution containing not substantially less than 10 percent by weight of hypochlorous acid is secured and recovering the unabsorbed chlorine.

15. A process of preparing hypochlorous acid which comprises contacting chlorine with an alkaline alkali metal compound to convert a portion of said chlorine to chlorine monoxide, contacting the mixture of chlorine and chlorine monoxide thereby produced and at least about 40 percent by volume of a gaseous diluent with sufficient water at a temperature not substantially about 25° C. to absorb a substantial amount of chlorine monoxide without substantial absorption of chlorine and recovering unreacted chlorine.

16. In the process of preparing hypochlorous acid from a gaseous mixture containing a substantial quantity of chlorine, at least 40 percent by volume of diluent gas and not substantially in excess of 5 percent by volume of chlorine monoxide which comprises contacting the mixture with sufficient water at a temperature not substantially in excess of 25° C. in an amount sufficient to absorb chlorine monoxide and to form a solution containing at least about 10 percent by weight of hypochlorous acid but insufficient to permit substantial absorption of chlorine and recovering unabsorbed chlorine.

IRVING E. MUSKAT.
GEORGE H. CADY.

CERTIFICATE OF CORRECTION.

Patent No. 2,240,344. April 29, 1941.

IRVING E. MUSKAT, ET AL.

It is hereby certified that error appears in the printed specification of the above numbered patent requiring correction as follows: Page 3, second column, line 63, claim 10, strike out the word "purified" and insert the same before "mixture" in line 62, same claim; page 4, second column, line 20, claim 15, for "about" read --above--; and that the said Letters Patent should be read with this correction therein that the same may conform to the record of the case in the Patent Office.

Signed and sealed this 1st day of July, A. D. 1941.

(Seal)

Henry Van Arsdale,
Acting Commissioner of Patents.